United States Patent [19]

Kaneko

[11] Patent Number: 4,979,549
[45] Date of Patent: Dec. 25, 1990

[54] AUTOMOBILE TIRE WITH HOLES FROM THE TREAD TO THE TIRE SIDES

[76] Inventor: Toshio Kaneko, 18-41 2-bancho Kurakuen, Nishinomiya, Japan

[21] Appl. No.: 343,549

[22] Filed: Apr. 21, 1989

[30] Foreign Application Priority Data

Jan. 19, 1989 [JP] Japan ................... 1-11725

[51] Int. Cl.⁵ ................... B60C 11/00; B60C 13/02
[52] U.S. Cl. ................... 152/209 R; 152/523
[58] Field of Search .......... 152/209 R, 209 D, 209 B, 152/523; 305/11-14

[56] References Cited

U.S. PATENT DOCUMENTS

| | | | |
|---|---|---|---|
| 1,877,988 | 9/1932 | Shrank | 152/209 R |
| 2,575,439 | 11/1951 | Billingsley | 152/209 R |
| 3,532,147 | 10/1970 | Gough et al. | 152/209 R |
| 3,848,651 | 11/1974 | French | 152/209 R |
| 4,531,787 | 7/1985 | Hart et al. | 305/12 |

*Primary Examiner*—Caleb Weston
*Assistant Examiner*—Geoffrey L. Knable
*Attorney, Agent, or Firm*—Wenderoth, Lind & Ponack

[57] ABSTRACT

This invention provides an automobile tire with communicating holes bored from the tire's tread to the sides of the tire. These holes permit snow or water which has come under the tire to be discharged to the outside through these communicating holes, thereby contributing to prevention of the tire's slip. For more effective discharge of snow or water, a well sliding surface material is applied on the inner surfaces of the communicating holes.

7 Claims, 2 Drawing Sheets

AUTOMOBILE TIRE WITH HOLES FROM THE TREAD TO THE TIRE SIDES

PRIOR ART

The present invention relates to an automobile tire and particularly pertains to an automobile tire for use in snowy areas.

Heretofore, for prevention of automobile tire slip brought about by water or snow in snowy areas, a large number of cavities are provided on its tread, a tire chain is wound thereabout or a plurality of metal nails are driven thereinto. Particularly, in tires provided with such cavities, it has been contemplated to deepen such cavities for them to be able to trap water or snow on the road.

However, tires with a plurality of cavities provided on their treads have posed a problem in that the tires slip as the cavities become fully stuffed with snow. Deepening of the cavities as hereabove mentioned will not offer a fundamental solution to this problem. Thus, the snow lumps which have come into the cavities interiors will finally fully fill them, causing the same trouble.

Winding a tire chain about the tire's tread poses an inconvenience in attaching and detaching this tire chain.

Tires with metal nails driven thereinto will cause dust pollution when the automobile is running on a snowless road.

OBJECTS OF THIS INVENTION

One of the objects of this invention is to provide an automobile tire which permits prevention of the slip of a tire caused by water or snow while the automobile is running, which does not require attachment and detachment of anything, and which will not cause dust pollution.

Another object of this invention is to prevent a tire from slipping on snow by discharging snow or water on the road from the tread side of the tire to the outside through communicating holes bored in the tire and its side.

Still another object of this invention is to use such a surface material of the communicating hole inside that facilitates quick discharge of snow or water.

Other objects and effects of this invention will be more clearly understood from the following more detailed description of this invention taken hereunder in connection with its preferred embodiments.

Figure 1:
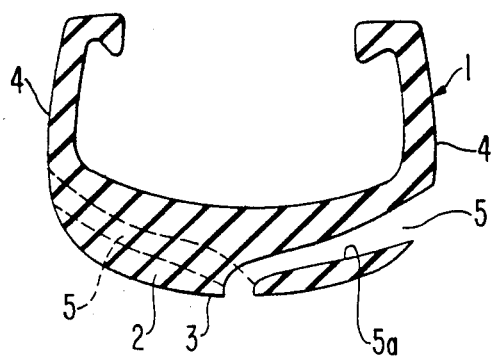
FIG. 1 is a sectional view of an automobile tire of this invention taken through a first row of communicating holes.
Figure 2:
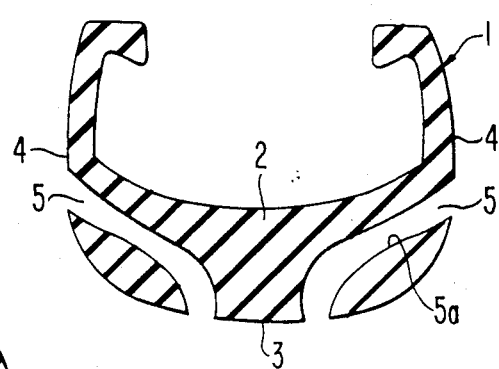
FIG. 2 is a sectional view taken through a second row of communicating holes.
Figure 3:
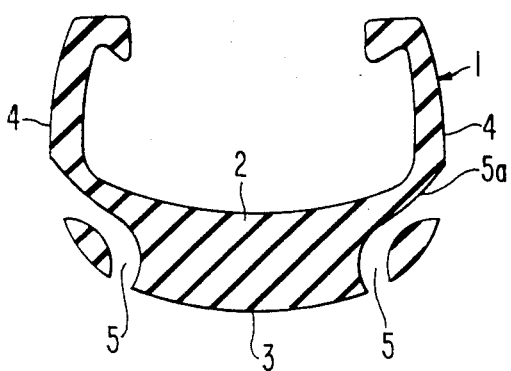
FIG. 3 is a sectional view taken through a third row of communicating holes.

DETAILED DESCRIPTION OF THE INVENTION:

As shown in FIGS. 1 through 4, a tire 1 has its tread side 2 formed thick, and in this thick part 2, a large number of communicating holes 5 are bored from its tread 3 to sides 4. Of these communicating holes 5 only one hole of a first row A, as numbered in the circumferential direction, is bored, as shown in FIG. 1, from the central part on the side of the tread 3 of the tire 1 to the tire side 4. The holes of the next, second row B are bored, as shown in FIG. 2, from areas a little spaced from the center of the tread 3 toward both sides of the tread to both tire sides 4, respectively, and two holes of a third row C are bored from areas further spaced from the center of the tread 3 toward both sides of the tread to both tire sides 4. These holes are bored throughout the whole circumference of the tire by repeating the pattern of these first through third rows. The communicating holes of this embodiment are all formed square in cross-section for achieving the edge effect when the tread is brought in contact with the ground.

On the inner surface 5a of the communicating hole 5, a well sliding surface material of silicone, etc., is applied, which is not shown in the drawings.

With the aforementioned composition adopted, when an automobile equipped with this tire runs on a snowy or wet road, snow or water on the road will come into each communicating hole 5 from the tread side 3 and will be discharged to the outside through these communicating holes 5 and, then, the discharge ports at tire sides 4. Even if snow is trapped in the interior, it will be thrust out by new snow lumps successively brought in. Therefore, this tire is free of hindrance to discharge of snow or water on road due to stuffing of holes.

On this account, slip of tire 1 due to snow or water is preventable, without requiring attachment and detachment of tire chain or inducing metal nail dust pollution.

FIGS. 5-8 represent another embodiment of this invention in which communicating holes 5; circular in cross-section, are formed by tubular bodies 7 formed integrally with the tire 1 extending from the tread 3 of the tire 1 through the cavity 6 in the tire interior to the tire sides 4. This tubular body may be separately formed with a high pressure resistant hose and communicatively fit in holes formed in the tire 1, to be bonded thereto from the inside. It is also possible to insert such a high pressure resistant hose into the communicating hole 5 of the first embodiment, lest it be squashed by the pressure applied when the tread is brought in contact with ground.

Figure 4:
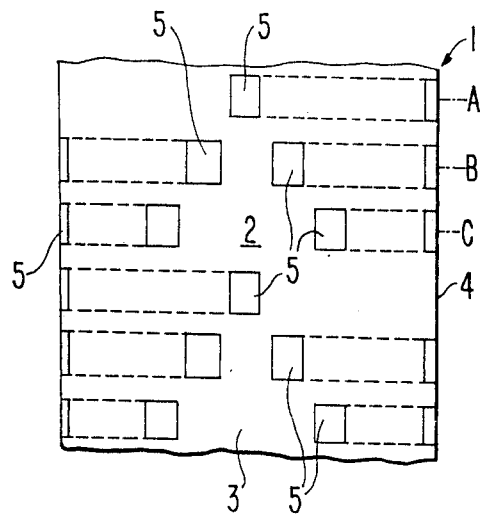
FIG. 4 is a partial front view of the tire.
Figure 5:
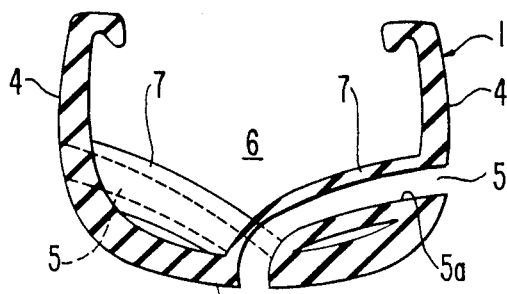
FIG. 5 is a sectional view of an automobile tire of a second embodiment of this invention taken through a first row of communicating holes.
Figure 6:
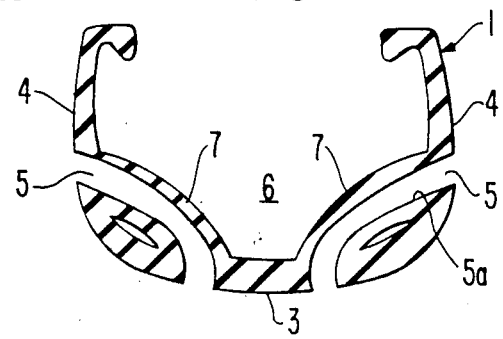
FIG. 6 is a sectional view taken through a second row of communicating holes.
Figure 7:
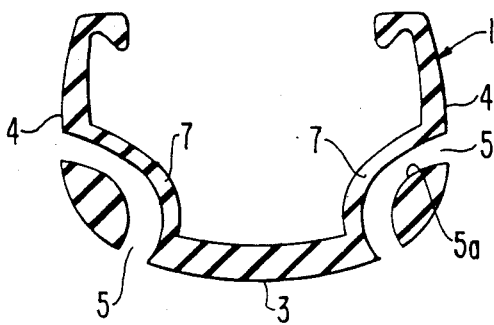
FIG. 7 is a sectional view taken through a third row of communicating holes.
Figure 8:
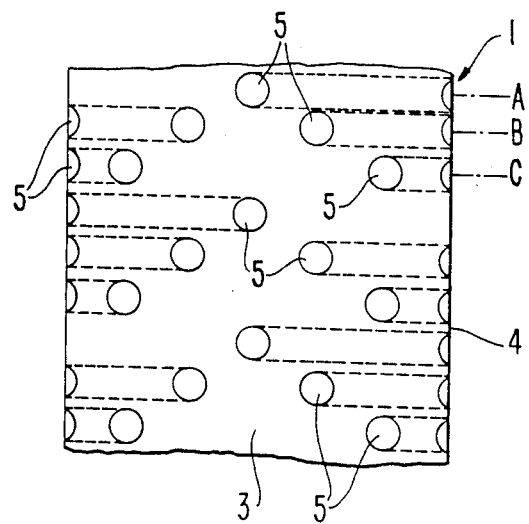
FIG. 8 is a partial front view of this tire.

In whichever embodiment above described, by making both the tire's sides 4 or the exit sides of the communicating hole 5 a little larger, discharge of snow, etc., is further improved. Also, as shown in FIGS. 4 and 8, the holes or passages 5 have the same cross-sectional shape at the tread surface and the sidewall surface.

The foregoing describes preferred modes of this invention, but this invention will not be limited by them and will permit various modifications, without departing from the spirit of the invention, as defined by the claims set forth hereunder:

I claim:

1. An automobile tire, comprising:
   a circular tire having a tread portion about the outer circumference of said tire and sidewall portions extending from either side of said tread portion; and means defining a plurality of passages extending from a surface of said tread portion to a surface of said sidewall portions for enabling the passage of snow and water through said plurality of passages from said tread portion to said sidewall portions, wherein each said passage of said plurality of passages has the same cross-sectional shape at both the surface of said tread portion and the surface of said sidewall portion and is curved in a substantially smooth and continuous curve from said surface of said tread portion toward said sidewall portions for smooth passage of snow and water therethrough.

2. The automobile tire as set forth in claim 1, wherein: said tread portion has a tread surface onto which each said passage opens, each said passage being substantially perpendicular to said tread surface at said tread portion.

3. The automobile tire of claim 1, wherein: said circular tire comprises a tire body having a cavity therein; and said means defining said plurality of passages comprises a plurality of tubular bodies extending from said tread portion to said sidewall portion through said cavity in said tire body.

4. The automobile tire as set forth in claim 1, wherein: each said passage has a lubricating surface layer therein.

5. The automobile tire as set forth in claim 1, wherein: said tread portion provides a road contact surface for said tire, with said sidewall portions extending upwardly therefrom; and said plurality of passages open onto said sidewall portions at a point spaced substantially above said tread portion such that said passages extend substantially above the roadway to enable proper discharge of snow and water therefrom.

6. The automobile tire as set forth in claim 1, wherein: said plurality of passages comprise different lengths of passages such that said passages open up onto said tread position at different locations along the width thereof.

7. The automobile tire as set forth in claim 1, wherein: each said passage of said plurality of passages is larger in cross-section at the surface of said sidewall portion than at the surface of said tread portion.

* * * * *